United States Patent

[11] 3,576,973

[72] Inventor Wilburn D. Draper
Thousand Oaks, Calif.
[21] Appl. No. 820,400
[22] Filed Apr. 30, 1969
[45] Patented May 4, 1971
[73] Assignee International Business Machines Corporation
Armonk, N.Y.

[54] BINARY REGISTER

16 Claims, 2 Drawing Figs.

[52] U.S. Cl. .... 235/92, 307/222, 328/42
[51] Int. Cl. .... G06m 3/14, H03k 21/06
[50] Field of Search .... 235/92; 307/220, 222; 328/39, 42

[56] References Cited

UNITED STATES PATENTS

| | | | |
|---|---|---|---|
| 2,800,276 | 7/1957 | Harper | 235/92(51) |
| 2,813,676 | 11/1957 | Boyer et al. | 235/92(51) |
| 2,823,856 | 2/1958 | Booth et al. | 307/222X |
| 3,020,481 | 2/1962 | Hulst | 328/42 |

*Primary Examiner*—Maynard R. Wilbur
*Assistant Examiner*—Joseph M. Thesz, Jr.
*Attorneys*—Hanifin and Jancin and Normal R. Bardales

ABSTRACT: A versatile binary register which has control means for selectively setting the register to the one's and two's complements in response to first and second control signals, respectively. In addition, alternate application of the first and second control signals causes the register to function as a counter which operates in the forward mode if the first and second control signals are applied in a given sequence and/or operates in the reverse mode if the signals are applied in an opposite sequence.

| | STEP | P1 | P2 | FF1 | FF2 | FF3 | FF4 | $2^0$ | $2^1$ | $2^2$ | $2^3$ | DEC |
|---|---|---|---|---|---|---|---|---|---|---|---|---|
| | 0 | 0 | 0 | 0 | 0 | 0 | 0 | 0 | 0 | 0 | 0 | 0 |
| FWD | 1a | 1 | 0 | 1 | 1 | 1 | 1 | X | X | X | X | X |
| | 1b | 0 | 1 | 1 | 0 | 0 | 0 | 1 | 0 | 0 | 0 | 1 |
| | 2a | 1 | 0 | 0 | 1 | 1 | 1 | X | X | X | X | X |
| | 2b | 0 | 1 | 0 | 1 | 0 | 0 | 0 | 1 | 0 | 0 | 2 |
| | 3a | 1 | 0 | 1 | 0 | 1 | 1 | X | X | X | X | X |
| | 3b | 0 | 1 | 1 | 1 | 0 | 0 | 1 | 1 | 0 | 0 | 3 |
| | | | | | | | | | | | | |
| | 15b | 0 | 1 | 1 | 1 | 1 | 1 | 1 | 1 | 1 | 1 | 15 |
| | 16a | 1 | 0 | 0 | 0 | 0 | 0 | X | X | X | X | X |
| | 16b | 0 | 1 | 0 | 0 | 0 | 0 | 0 | 0 | 0 | 0 | 0 |
| REV | 17a | 0 | 1 | 0 | 0 | 0 | 0 | X | X | X | X | X |
| | 17b | 1 | 0 | 1 | 1 | 1 | 1 | 1 | 1 | 1 | 1 | 15 |
| | 18a | 0 | 1 | 1 | 0 | 0 | 0 | X | X | X | X | X |
| | 18b | 1 | 0 | 0 | 1 | 1 | 1 | 0 | 1 | 1 | 1 | 14 |
| | 19a | 0 | 1 | 0 | 1 | 0 | 0 | X | X | X | X | X |
| | 19b | 1 | 0 | 1 | 0 | 1 | 1 | 1 | 0 | 1 | 1 | 13 |
| FWD | 20a | 1 | 0 | 0 | 1 | 0 | 0 | X | X | X | X | X |
| | 20b | 0 | 1 | 0 | 1 | 1 | 1 | 0 | 1 | 1 | 1 | 14 |

*INVENTOR*
WILBURN D. DRAPER

BY Norman R. Bardales

*ATTORNEY*

BINARY REGISTER

BACKGROUND OF THE INVENTION

This invention relates to binary registers of the type for storing binary coded digital information and is particularly useful as a binary counter.

Binary registers for storing digital information are well known in the art and are utilized, for example, extensively with digital data processing systems and the like. In certain prior art devices, the registers were generally capable of storing the digital information in an exclusive one of the different types of binary complements. Thus, in the prior art a separate different register was generally required for each of the different types and hence the prior art devices were not very versatile and/or required additional operating step(s) and/or conversion circuitry to convert from a given complement's type to a different type.

Moreover in the prior art register devices known as counters, both in the unidirectional type and bidirectional or reversible type, there was generally required considerable equipment and complex gating circuitry between the bistable stages of the counter to provide the unidirectional or bidirectional counting functions. Furthermore, where high speed operations were desired, the prior art devices required additional interstage circuitry.

It is an object of this invention to provide a versatile binary register.

It is another object of this invention to provide a binary register which has relatively simple circuitry connections between its bistable stages.

Still other objects of this invention are to provide a binary register which provides a one's complement and/or a two's complement and/or is a counter of the unidirectional and/or bidirectional types.

Still another object of this invention is to provide a relatively high speed counter.

According to one aspect of the invention there is provided binary register circuit apparatus for storing multiorder binary numbers. The register apparatus includes in combination a plurality of bistable means and selectable control means. Each bistable means is associated with a mutually exclusive one of the orders of the binary numbers and has an input means and output means, respectively. The selectable control means selectively sets the apparatus to one's and two's complements. In one mode, the control means is adapted to apply a first signal to the input means of each of the bistable means to provide the one's complement of the binary number stored in the apparatus. The control means in another mode is adapted to apply a second signal to the input means of the bistable means associated with the next-to-lowest order and to the respective input means of the bistable means associated with the succeeding orders thereof to provide the two's complement of the binary number stored in the apparatus.

According to another aspect of the invention, in the aforementioned binary register circuit apparatus, the selectable control means further alternately applies the first and second signals in pairs, and the circuit apparatus in response to each pair of alternate signals is advanced from a binary number in a given series to the next binary number of the series.

According to still another aspect of the invention there is provided a binary register for storing multiorder binary coded digital information. The register includes a plurality of bistable means. Each bistable means is associated with a mutually exclusive one of the orders of the binary coded information and has input means and output means, respectively. Also included is a control means coupling the output means of each of the succeeding higher order bistable means. The control means has two control input means. The register is selectively settable to the one's and two's complements of its previous state. More particularly, the register is set to the one's complement in response to a first signal applied to the input means of the lowest order bistable means and a predetermined one of the two control input means, and is set to the two's complement in response to a second signal applied to the other of the two control input means.

The foregoing and other objects, features and advantages of the invention will be apparent from the following more particular description of the preferred embodiments of the invention, as illustrated in the accompanying drawing.

BRIEF DESCRIPTION OF THE DRAWING

In the FIGS. like elements are designated with similar reference numerals.

DESCRIPTION OF THE PREFERRED EMBODIMENTS

Figures 1, 2:
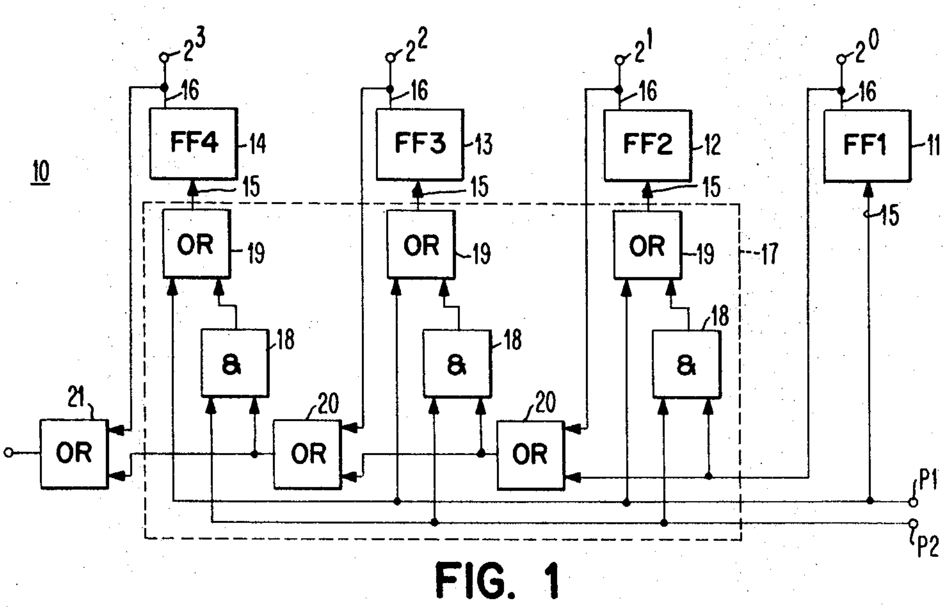
FIG. 1 is a schematic view illustrated in block form of a preferred embodiment of the binary register of the present invention.
FIG. 2 is a table illustrating the principles of operation of the register of FIG. 1.

Referring now to FIG. 1, register 10 has plural bistable means shown by way of example as four stages 11—14. The bistable means or stages 11—14 are preferably multivibrators or flip-flops and are designated in FIG. 1 by the legends FF1 to FF4, respectively. Each of the stages 11—14 has an input 15, and an output 16. In FIG. 1, the input 15 corresponds to the complement input of the particular flip-flop as this input is generally referred to in the art. By way of example, the output 16 corresponds to the 1 or true output of the particular flip-flop as this output is generally referred to in the art. The outputs 16 of stages 11 to 14 are connected to individual ones of the output terminals designated $2^0$ to $2^3$, respectively. It is to be understood that FF1 stage 11 is the lowest order stage, FF2 is the next lowest, etc.

A control means shown generally in the dash line block 17 couples the respective output 16 of each of the stages 11—14 to the respective inputs 15 of all the succeeding higher stages. The control means 17 has two control inputs connected to terminals P1 and P2, respectively. The input 15 of the first or low or lowest order stage 11 is also commonly coupled to the control input of control means 17 that is connected to terminal P1. As will become apparent hereinafter, a signal applied to terminal P1 sets the binary state of the register 10 to the one's complement thereof; whereas, a signal applied to terminal P2 sets the binary state of the register 10 to the two's complement thereof.

Between each of the stages 11 to 14, control means 17 provides a cascaded arrangement which includes a two input AND gate 18 and a two input OR gate 19. One of the inputs of each of the OR gates 19 are commonly connected with respect to each other and the input 15 of the lowest order stage 11 and consequently to the terminal P1. The other input of each OR gate 19 is connected exclusively to the output of the AND gate 18 with which it is associated. Also, commencing with the next-to-next lowest order stage 13 and each succeeding stage thereafter, a respective two input OR gate 20 is provided. One input of each OR gate 20 is connected to the output 16 of the preceding lower order stage. The other input of each OR gate 20 is connected to the output of the OR gate 20 of the preceding lower order stage with the exception of the first OR gate 20 which is associated with the next-to-next lower order stage 13. The other output of the OR gate 20 associated with stage 13 is connected to the output 16 of the lowest order, i.e. first, stage 11. The output of each OR gate 20 is also connected to the other input of the particular AND gate 18 of the stage with which the particular gate 20 is associated. Control signals applied to terminal P2 are ANDed by the particular gate 18 with the output of a gate 20 or output 16 of stage 11 as the case may be. Each OR gate 19 ORs the output of the particular AND gate 18 connected to one of its inputs with the control signals applied to terminal P1, the last-mentioned control signals being also fed directly to the input 15 of the lowest order stage 11.

The one'3, and two's complements of the digital information, i.e. the binary number, stored in register 10 are provided at outputs 16 and consequently, as shown in FIG. 1, at the terminals $2^0$ to $2^3$, respectively. If desired, an additional logic stage, e.g. two input OR circuit 21, is provided for those applications where it may be required to sense when the outputs 16 of the register 10 are all in 0 states. For this purpose, OR gate 21 has one of its inputs connected to the output 16 of the highest order, i.e. last, stage 14. Its other input is connected to the output of the last or lefthand OR gate 20 as viewed in FIG. 1 which is associated with the last stage 14. The lefthand OR gate 20 ORs the outputs 16 of the other preceding stages 11—13 by virtue of the connection of one of its inputs to the output 16 of stage 13, and the connection of its other input to the output of the right-hand OR gate 20. The right-hand OR gate 20, in turn, ORs the outputs 16 of stages 11 and 12.

Referring now to FIGS. 1 and 2, the operation of the invention will first be described with reference to the counter operational mode of the register 10. In the table of FIG. 2 and reading from left to right, the first column denotes successive operative steps 0, 1*a*, 1*b*, 2*a*, 2*b*, etc. associated with the advancing of the register 10. In the next two columns a binary 1 and a binary 0 represents the presence and absence, respectively, of a signal at the terminals P1, P2 of FIG. 1. The next four columns designate the actual binary states of the respective outputs 16 of the stages 11 to 14 and are accordingly designated with the aforementioned legends FF1 to FF4, respectively, for sake of clarity. The next four columns $2^0$ to $2^3$ designate the binary number represented by the binary states of stages 11 to 14, respectively; and the last column designated DEC is the decimal equivalent of the corresponding binary number.

Initially, it is assumed the register 10 is cleared by an appropriate signal applied to its clear or to its RESET inputs, not shown, and consequently each of the outputs 16 is at a 0 level and the binary and corresponding decimal numbers are both 0. By way of example, it is assumed that it is desired to advance the counter or register 10 in the forward direction. To count in the forward direction signals are applied alternately to terminals P1 and P2 in the sequence first to terminal P1 and next to terminal P2. This sequence is sometimes referred to hereinafter as the P1/P2 sequence. Accordingly, a signal pulse is applied to terminal P1 at step 1*a*. This signal pulse is fed simultaneous to the complement input 15 of stage 11 and via the respective OR gates 19 to the respective complement inputs 15 of stages 12—14. As a consequence, the previous 0000 state register 10 is set to the one's complement 1111. As used herein, the right-hand bit of the binary numbers is the least significant bit, i.e. the $2^0$ bit, in accordance with applicable conventional binary rotation. It should be understood that as a result of the one's complementation, the outputs $2^0$ to $2^3$ are all at 1 levels in step 1*a* but are omitted in FIG. 2 for sake of clarity. The 1 level at output $2^0$ directly conditions the input of the AND gate 18 to which the output $2^0$ of stage 11 is connected. The respective 1 levels of outputs $2^1$ and $2^2$ indirectly condition the appropriate AND gates 18 through the appropriate AND gates 18 through the appropriate OR gates 20 to which the outputs $2^1$ and $2^2$ are respectively connected.

In the next step 1*b*, a signal pulse is applied to the other terminal P2. This pulse is ANDed in each of the AND gates 18 due to the respective outputs $2^0$ to $2^2$ being in the 1 level as a result of step 1*a*. As a result, stages 12—14 are complemented resulting in the previous binary number 1111 being set to its two's complement; to wit: 0001, and which corresponds to a decimal 1, as illustrated in the table of FIG. 2. Thus, the register 10 acts as a counter and is advanced in the forward direction FWD by application of alternate signal pulses to terminals P1 and P2 in the P1/P2 sequence.

In the next steps 2*a* and 2*b* the signal pulses are again applied in the same P1/P2 sequence. The pulse applied to terminal P1 in step 2*a* again one's complements the 0001 state of register 10 to a 1110 state. The subsequent application of the signal pulse at terminal P2 in step 2*b* in turn two's complements the 1110 state to the 0010 state which corresponds to a decimal 2. Thus, as long as the signals are applied alternately to the terminals P1 and P2, the register 10 acts as a counter and when applied in the P1/P2 sequence P1, the register 10 counts in the forward direction.

For purposes of explanation during steps 1*a* to 15*b* of FIG. 2, it is assumed that the register 10 continues to be advanced in the forward direction. When it reaches its storage capacity, e.g. state 1111 at step 15*b*, further application of alternate signals to terminals P1 and P2 in the P1/P2 sequence, c.f. steps 16*a* and 16*b*, respectively, causes the register 10 to advance to its 0000 state thus recycling the register 10. If more alternate signals are thereafter applied in the P1/P2 sequence the counter continues to count in the forward direction.

For purposes of explanation it is assumed that during steps 17*a* to 19*b* the register again acts as a counter but is operated in a reverse direction REV. The control signals are again applied alternately but in an opposite sequence to that of the P1/P2 sequence aforedescribed. Thus to count in the reverse direction, the signals are alternately applied in a sequence of first to the terminal P2 and then to the terminal P1, this latter sequence being referred to hereinafter as the P2/P1 sequence.

As shown in step 16*b*, the outputs $2^0$ to $2^3$ are in 0 states. Therefore, in step 17*a* when a signal pulse is applied to the terminal P2 and consequently to the appropriate ones of the inputs of AND gates 18, the outputs of stages $2^1$ to $2^3$ remain in 0 states due to the absence of 1 levels to the other inputs of AND gates 18. Since the input 15 of stage 11 is not connected to terminal P2, it too remains in its 0 state. Upon application of the alternate pulse to terminal P1 in step 17*b* the stages 11—14 are complemented resulting in the 0000 state thereof being set to the one's complement that is the 1111 state which is decimal 15. Each subsequent application of alternate pulses to the terminals P1, P2 in the P2/P1 sequence thereafter cause the register to count reversibly, i.e. to be advanced in the reverse direction.

By way of example, it is assumed that at the conclusion of step 19*b* when the register is in the binary 1101 state, i.e. decimal 13, it is desired to reverse the counting direction of register 10. As shown in FIG. 2, this is accomplished by reverting back to the P1/P2 sequence. Thus as shown by the steps 20*a*, 20*b*, signals are applied to the terminals P1, P2 in the P1/P2 sequence and the register 10 is advanced in the forward direction. More specifically, the binary 1101 state of the register is one's complemented by the pulse at terminal P1 in step 20*a* and hence is in the state 0010. Thereafter, the second pulse of the P1/P2 sequence which is applied to terminal P2 two's complement the 0010 state thereby changing it to the 1110 state or decimal 14.

If it is desired to operate the register 10 as a one's complement generator then the signal or signals are applied exclusively to terminal P1. Likewise, if it is desired to operate the register 10 as a two's complement generator then the signal or signals are applied exclusively to terminal P2. It should be understood that when the register 10 is operated as a complement's generator, suitable address means, not shown, coupled to the respective set and/or reset inputs, not shown, of the multivibrators 11—14 are provided for setting the register to the particular binary number for which it is desired to be complemented. Likewise, the addressing means, not shown, can also be utilized to set the register 10 to a particular binary number from which it is desired to initiate the count in either the forward or reverse direction.

Circuits for implementing the individual bistable circuits 11—14 and logic circuits 18—21, as well as their operations, are well known in the art and are omitted herein for sake of clarity. By way of example, the reference entitled "Digital Computer Fundamentals" by Thomas C. Bartee and published by McGraw-Hill, 1960, describes suitable circuits for this purpose particularly the OR, AND, and flip-flop circuits illustrated on pages 70, 78 and 84, respectively, thereof.

It should be understood that the particular embodiment has been described, by way of example, as including four stages 11—14 but that in actual practice the invention may be practiced with more or less plural stages, if desired. Moreover, the particular embodiment has been described using conventional positive logic circuitry but it should be also understood that other types of logic circuitry such as negative logic, and/or combinations thereof, may be utilized.

Thus, while the invention has been particularly shown and described with reference to the preferred embodiments, it will be understood by those skilled in the art that the foregoing and other changes in form and detail may be made therein without departing from the spirit and scope of the invention.

I claim:

1. Binary register circuit apparatus for storing multiorder binary numbers, said circuit apparatus comprising in combination:

a plurality of bistable means for storing said binary numbers, each of said bistable means being associated with a mutually exclusive one of the orders of said binary numbers, each of said bistable means having input means and output means, respectively; and selectable control means for selectively applying a first signal to the respective input means of said plurality of bistable means to provide at the respective output means of said plurality of bistable means the one's complement of the binary number stored therein and a second signal to the respective input means of the ones of said plurality of bistable means associated with the next-to-lowest order and the succeeding orders thereof to provide at the respective output means of said plurality of bistable means the two's complement of the binary number stored therein.

2. Binary register circuit apparatus according to claim 1 wherein said selectable means further alternately applies said first and second signals in pairs, said circuit apparatus in response to each pair of alternate signals being advanced from a binary number in a given series to the next binary number of the series.

3. Binary register circuit apparatus according to claim 2 wherein the binary numbers of said given series are consecutive and correspond to consecutive decimal numbers, said circuit apparatus being advanced in the forward direction when each signal pair is applied in the sequence of a said first signal and a subsequent said second signal, and said circuit apparatus being advanced in the reverse direction when each signal pair is applied to an opposite sequence of a said second signal and a subsequent first signal.

4. Binary register circuit apparatus according to claim 1 wherein said selectable means further comprises:

a plurality of logic stages for intercoupling said bistable means, each of said logic stages being associated with a particular one of the higher order bistable means and coupling the input means of the particular higher order bistable means associated therewith to the respective outputs of the preceding lower order bistable means, said higher order bistable means being the ones of said plurality of bistable means associated with the next-to-lowest and succeeding orders of the binary numbers.

5. Binary register circuit apparatus according to claim 4 wherein each of said logic stages comprises at least:

first two input OR gate means having an output coupled to the input means of the particular higher order bistable means associated therewith, and two input AND gate means having an output coupled to one of the inputs of the first OR gate means of the particular logic stage thereof, the other inputs of each of said first OR gate means being commonly coupled to each other and to the input means of the lowest order bistable means; and wherein each of said logic stages associated with the next-to-next lowest order stage and the succeeding order stages thereto further comprises:

second two input OR gate means having an output coupled to one of the inputs of the AND gate means of the particular logic stage thereof and to one of the inputs of the second OR gate means of the logic stage associated with the succeeding order bistable means, the other input of the second OR gate means being coupled to the output means of the preceding lower order bistable means, the other input of the second OR gate means of the logic stage associated with the next-to-next lowest order bistable means being coupled to the output means of the lowest order bistable means; and the output means of the lowest order bistable means being coupled further to one of the inputs of the AND gate means of the logic stage associated with the next-to-lowest bistable means, and the other inputs of the AND gate means of each of the logic stages being commonly coupled to each other.

6. Binary register circuit apparatus according to claim 1 further comprising detector means for detecting the simultaneous presence of binary 0 levels at each of said output means.

7. Binary register circuit apparatus according to claim 1 wherein said detector means comprises an OR type logic circuit means for ORing said output means.

8. Bistable register circuit apparatus according to claim 1 wherein each of said bistable means further comprises:

a multivibrator having a complementary input, said input means of a particular bistable means comprising the particular complementary input of the multivibrator thereof.

9. A binary register for storing multiorder binary coded digital information, said register comprising in combination:

a plurality of bistable means, each of said bistable means being associated with a mutually exclusive one of the orders of said binary coded information and having input means and output means, respectively; and control means coupling the output means of each bistable means to the respective input means of each of the succeeding higher order bistable means, said control means having first control input means and second control input means, respectively, said first control input means being commonly coupled to the input means of said plurality of bistable means, and said second control input means being commonly coupled to the input means of the next-to-last lowest order and each succeeding higher order ones of said plurality of output means; said register being set to the one's complement of its previous state in response to a first signal applied to said first control input means and being set to the two's complement of its previous state in response to a second signal applied to said second control input means.

10. A binary register according to claim 9 wherein said first and second signals are applied alternately to the first and second control input means, respectively, in a predetermined sequence to cause said register to count in a first direction.

11. A binary register according to claim 9 wherein said first and second signals are applied to the first and second control input means, respectively, to cause said register to count, said register counting in the forward direction whenever the control signals are applied in the sequence of a said first signal and a subsequent said second signal, and said register counting in the reverse direction whenever the control signals are applied in the sequence of a said second signal and a subsequent said first signal.

12. A plural stage binary register for storing binary coded digital information, each of the stages of said register being associated with a mutually exclusive one of the successive binary orders of the binary numbers to be stored therein, said binary register comprising in combination:

a plurality of bistable multivibrators having an output and a complementary input, each of said bistable multivibrators being comprised in a mutually exclusive one of the stages of said binary register;

each of the stages associated with the next-to-lowest and succeeding orders thereto comprising at least:

a first two input OR gate circuit having an output coupled to the complementary input of the multivibrator of the particular stage, and a two input AND gate circuit having an output coupled to one of the inputs of the first OR gate circuit of the particular stage, the other inputs of each of said first OR gate circuits being commonly coupled to each other and to the complementary input of the multivibrator of the lowest order stage to provide a first common input means; and wherein each of the stages associated with the next-to-next lowest order and the succeeding orders thereto further comprises:

a second two input OR gate circuit having an output coupled to one of the inputs of the AND gate circuit of the particular stage and to one of the inputs of the second OR gate circuit of the stage associated with the succeeding order, the other input of the second OR gate circuit being coupled to the output of the multivibrator of the preceding lower order stage, the other input of the second OR gate circuit of the stage associated with the next-to-next lowest order being coupled to the output of the multivibrator of the lowest order stage; and the output of the multivibrator of the lowest order stage being coupled further to one of the inputs of the AND gate circuit of the stage associated with the next-to-lowest order, and the other inputs of the AND gate circuit of each of the stages being commonly coupled to each other to provide a second common input.

13. A plural stage binary register according to claim 12 further comprising: a two input third OR circuit having an output, one of said inputs of said third OR circuit being connected to the output of the multivibrator of the highest order stage and the other input of said third OR circuit being connected to the output of the second OR circuit of the highest order stage.

14. A plural stage binary register according to claim 12 wherein said register selectively provides a one's complement of the number stored therefor in response to a first signal applied to said first common input means, and a two's complement of the number stored therein in response to a second signal applied to said second common input means.

15. A plural stage binary register according to claim 14 wherein said register further counts in a given direction in response to said first and second signals being alternately applied to said first and second common input means, respectively, in a predetermined sequence.

16. A plural stage binary register according to claim 15 wherein said register further counts in the opposite direction in response to said first and second signals being alternately applied to said first and second common input means, respectively, in a sequence opposite to said predetermined sequence.

PO-1050
(5/69)

UNITED STATES PATENT OFFICE
CERTIFICATE OF CORRECTION

Patent No. 3,576,973 Dated June 21, 1971

Inventor(s) Wilburn D. Draper

It is certified that error appears in the above-identified patent and that said Letters Patent are hereby corrected as shown below:

Cover sheet, for attorneys, "Normal" should read -- Norman -
Col. 1 after the title, "BINARY REGISTER" insert the following paragraph:

--The invention herein described was made i the course of or under a contract or subcontract there under with the Department of the Air Force.--
Col. 2, line 74, change "one'3" to ---one's---.

Signed and sealed this 12th day of October 1971.

(SEAL)
Attest:

EDWARD M.FLETCHER,JR.
Attesting Officer

ROBERT GOTTSCHALK
Acting Commissioner of Paten